(12) United States Patent
Kim et al.

(10) Patent No.: US 10,599,798 B1
(45) Date of Patent: Mar. 24, 2020

(54) DOUBLE GLITCH CAPTURE MODE POWER INTEGRITY ANALYSIS

(71) Applicant: Ansys, Inc., Canonsburg, PA (US)

(72) Inventors: Sooyong Kim, Palo Alto, CA (US); Wenliang Zhang, San Jose, CA (US); Xiaoqin Liu, San Jose, CA (US); Yaowei Jia, San Jose, CA (US)

(73) Assignee: ANSYS, Inc., Canonsburg, PA (US)

( * ) Notice: Subject to any disclaimer, the term of this patent is extended or adjusted under 35 U.S.C. 154(b) by 89 days.

(21) Appl. No.: 15/851,913

(22) Filed: Dec. 22, 2017

Related U.S. Application Data

(60) Provisional application No. 62/443,216, filed on Jan. 6, 2017.

(51) Int. Cl.
  *G06F 17/50* (2006.01)

(52) U.S. Cl.
  CPC ........ *G06F 17/504* (2013.01); *G06F 17/5045* (2013.01)

(58) Field of Classification Search
  USPC ........................................................ 716/102
  See application file for complete search history.

(56) References Cited

U.S. PATENT DOCUMENTS

| | | | |
|---|---|---|---|
| 2010/0234061 A1* | 9/2010 | Khandekar | H04W 52/146 455/522 |
| 2010/0234071 A1* | 9/2010 | Shabtay | H04B 7/0408 455/562.1 |
| 2016/0349320 A1* | 12/2016 | Laisne | G01R 31/3177 |
| 2018/0045781 A1* | 2/2018 | Song | G01R 31/2815 |

\* cited by examiner

*Primary Examiner* — Mohammed Alam
(74) *Attorney, Agent, or Firm* — Jones Day

(57) ABSTRACT

Data is received that characterizes an integrated circuit and which includes a plurality of Standard Test Interface Language (STIL) codes and at least one file defining physical and/or logical parameters of the integrated circuit. Thereafter, using the received data, a power integrity analysis of the integrated circuit is performed to estimate power induced noise in a double glitch capture mode. Data is then provided that characterizes the performed double glitch capture mode power integrity analysis of the integrated circuit. Related apparatus, systems, techniques and articles are also described.

20 Claims, 3 Drawing Sheets

DOUBLE GLITCH CAPTURE MODE POWER INTEGRITY ANALYSIS

CROSS-REFERENCE TO RELATED APPLICATION

This application claims the benefit of U.S. Provisional Application No. 62/443,216, filed Jan. 6, 2017, hereby incorporated herein by reference.

BACKGROUND

Integrated circuits (ICs) are manufactured by a long sequence of high-precision and hence defect-prone processing steps. Hence, every individual semiconductor product needs to undergo stringent electrical tests to identify defective parts and guarantee outgoing product quality to the customer. The process Design For Testing (DFT) is focused on developing economically adequate tests for ICs. These tests need to assure sufficient quality at acceptable test application costs, corresponding to the target application area. As no IC can be released into high-volume production without an adequate manufacturing test, acceptable test development time is also of key importance.

Structural testing, in which tests are generated based on well-accepted defect-abstracting fault models, have largely replaced traditional functional tests, because they can be generated automatically in relatively short time, achieve objectively better defect coverage, and (in case of failing tests) allow diagnosis algorithms to pinpoint the type and location of the failure root cause. The latter enables automatic high-volume diagnosis to create process learning and yield improvement.

One of the main challenges in IC testing is the limited accessibility from the external chip pins to the internal circuitry of the IC. To improve controllability and the ability to observe, additional DFT hardware can be added to the functional circuitry; this typically amounts to 5-10% of the silicon area.

Scan design is a most common form of DFT design, whereby a test mode is added in which functional registers are concatenated into one or more shift registers that are accessible from the external test equipment. More advanced forms of DFT hardware include (i) 'wrappers' that allows modular testing of increasingly complex chips, (ii) on-chip decompression of test stimuli and compression of test responses, (iii) circuitry that tests parts of the IC itself without the need for external test equipment ('built-in self-test' or BIST), and (iv) on-chip features for the benefit of the chip user.

Today's large System-on-Chip (SoC) designs present many challenges to DFT processes. Tool runtime and the amount of memory required to load designs continue to grow and stretch available resources and design schedules. For DFT, much of the design and pattern generation activity has traditionally taken place late in the design cycle which puts such activities in the critical path to tape-out. As tool runtimes increase and different design disciplines contend for the same compute resources, DFT poses an even greater barrier to a timely tape-out.

In DFT mode, there is a need to conduct power integrity checks as are also required in functional mode. Power integrity noise can impact timing as well as functional failure in DFT mode and, in severe cases, often more power integrity noise can happen in DFT mode because of the tighter nature of the clock tree configuration and clustered simultaneous switch trend of such mode.

Upon generation of a DFT testing pattern, DFT engineers typically seek to determine which pattern will satisfy the required coverage as well as power integrity impact of the generated pattern. Increasing the coverage (i.e. area or size of circuit that can be tested with a pattern, etc.), often, in general, increases the toggle rate of the SoC; however, the local power noise hot spots can randomly occur in anywhere in an SoC design.

SUMMARY

In one aspect, data is received that characterizes an integrated circuit. Such data includes a plurality of Standard Test Interface Language (STIL) codes and at least one file defining physical and/or logical parameters of the integrated circuit. Thereafter, using the received data, a power integrity analysis of the integrated circuit is performed to estimate power induced noise in a double glitch capture mode. Data is then provided that characterizes the performed double glitch capture mode power integrity analysis of the integrated circuit.

Providing data can include at least one of: displaying the data characterizing the performed double glitch capture mode power integrity analysis of the integrated circuit in an electronic visual display, transmitting the data characterizing the performed double glitch capture mode power integrity analysis of the integrated circuit to a remote computing system, loading the data characterizing the performed double glitch capture mode power integrity analysis of the integrated circuit in into memory, or storing the data characterizing the performed double glitch capture mode power integrity analysis of the integrated circuit in physical persistence.

The provided data can in some implementations be a power report for each STIL code characterizing power induced noise for such STIL code.

The STIL codes can be in accordance with P. 1450.1 IEEE standard. The STIL codes can characterize a plurality of linked test structures to which the power integrity analysis is to be applied. The test structures can take many forms including, for example, scan flip-flips, multiplexer, clock control logics, decoder, encoders and the like.

Timing information, scan patterns, scan chains, control signals, and the linked test structures can be extracted from the STIL codes.

Files corresponding to each STIL code can be generated that have timing annotations propagating through the test structures in both shift-in mode and double glitch capture mode. The generated files can be equivalent to gate-level value change dump (VCD) files for the integrated circuit. Simulations can be performed using the generated files in double glitch capture mode. The simulations can be power simulations and/or power integrity simulations.

The STIL codes can be ranked according to user-specified constraint parameters. Instance voltage drop (IVD) can be simulated across the integrated circuit using the ranked STIL codes to obtain an IVD analysis for each STIL code, wherein the provided data comprises the IVD analysis for each STIL code.

The at least one file defining physical and logical parameters of the integrated circuit can include at least one of: a cell description library file, a design exchange file, a physical description file, or a file specifying timing parameters for the integrated circuit.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter enhanced techniques for integrated circuit debugging which utilize fewer processing resources and which can additionally reduce an overall debugging time by one to two months.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to computer aided engineering (CAE) software to facilitate the design and testing of integrated circuits having various graphical user interfaces for specifying various components of an IC. In particular, the current subject matter provides an integrated chip-package co-analysis solution that enables quick and accurate modeling of the package layout for inclusion in on-chip power integrity simulations. Further, with the current subject matter, an IC designer can perform static IR drop analysis and AC hotspot analysis of an IC package layout following static and dynamic analyses.

The current subject matter can also be used for identifying power integrity hotspots within ICs during the design process which, in turn, enables effective and accurate selection of appropriate patterns to incorporate into an IC. By identifying such hotspots, DFT designers can know, ahead of time, which patterns need to be selected and also what design decisions need to be made in order to make the IC design robust to those any given patterns under various tests.

The subject matter herein covers SoC design with shift registers that are accessible from external test equipment. With the methodology, tools utilizing standard Automatic Test Pattern Generator (ATPG) tools can use Standard Test Interface Language (STIL—P1450.1 IEEE standard) code to drive the methodology.

DFT engineers target for the coverage of the testing mode for each ATPG pattern. However, in order to optimally select patterns, DFT ATPG tools conventionally only relied on the toggle activity of flip-flops (FFs). By limiting the toggle rate of FFs, ATPG tools can estimate power upfront which, in turn, makes it possible to estimate power integrity to the area being tested. Such a method can, nonetheless, be insufficient because the toggle rate of FFs does not give full power estimation and even accurate power estimations do not represent the dynamic voltage drop glitch in the design.

Figure 1:
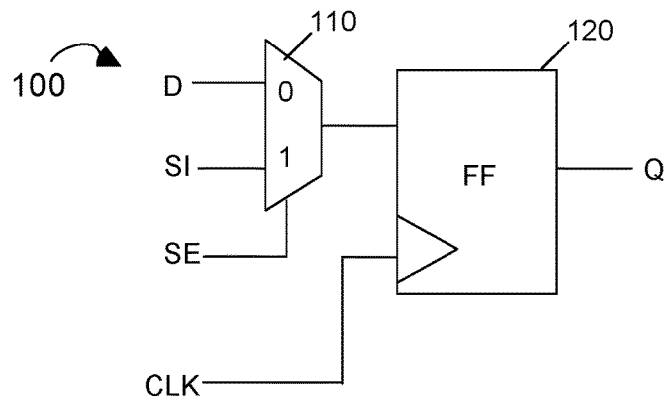
FIG. 1 is a diagram illustrating a flip-flop with a multiplexer.
Figure 2:
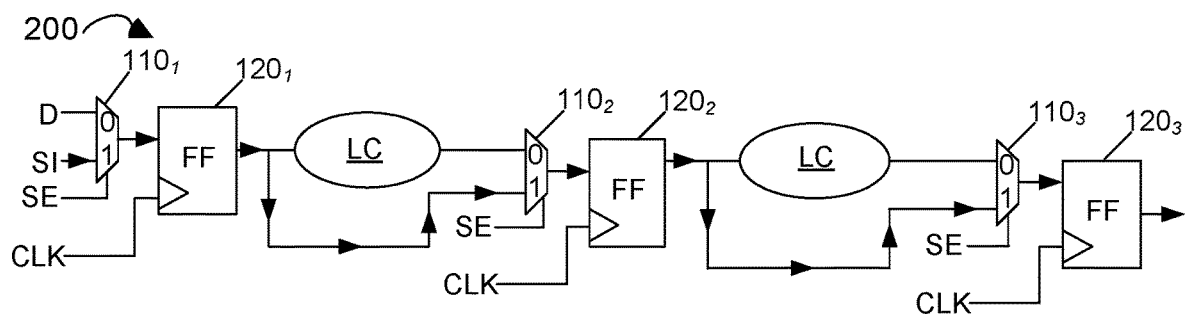
FIG. 2 is a first diagram illustrating a chain of flip-flops with multiplexers.
Figure 3:
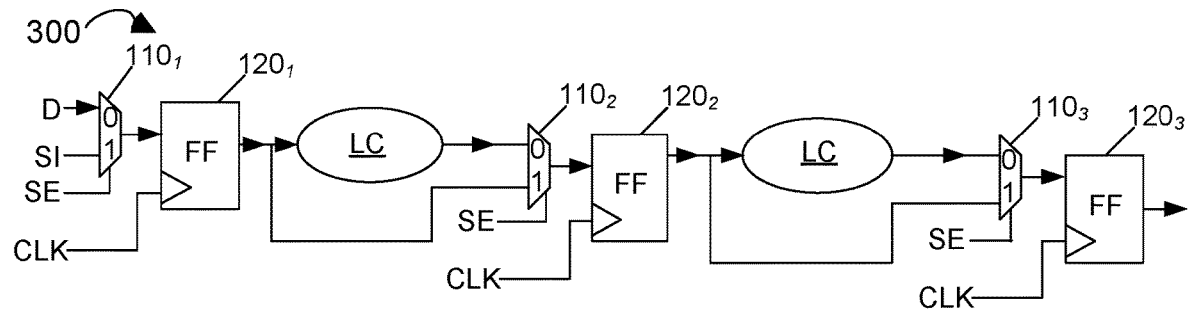
FIG. 3 is a second diagram illustrating a linked chain of flip-flops each with a corresponding multiplexers.

FIG. 1 is a diagram 100 illustrating the structure of a scan flip flop 120. A multiplexer 110 is added at the input of the flip-flop 120 with one input of the multiplexer acting as function input D, while other being Scan-in (SI). Scan-enable (SE) can select the signal between D or SI. With this basic scan flip flop 120, all the flops are connected, and the signal coming to the SI, when SE is enabled, gets propagated to the output Q pin of the scan flip flop 120 and the Q pin can be connected again to the SI input of the next stage multiplexer or flip flop (as illustrated in FIGS. 2 and 3). Having this chain structure, one can give series of patterns to the flip flop chains of the design. The mode with SE enabled can be referred to herein as "shift-in mode".

FIG. 2 is a diagram 200 illustrating the shift-in-mode with the enabled SE signal of each multiplexer $110_1$, $110_2$, $110_3$ of the corresponding scan flip-flop $120_1$, $120_2$, $120_3$. The arrows represent how the signal is propagated through the flip flops $120_1$, $120_2$, $120_3$ when SE is enabled in the shift-in mode.

Once all patterns are registered to each flip flop, the SE signal can be set to off mode, which means that the value at D pin of the flip flops $120_1$, $120_2$, $120_3$ will be propagated through the logic cones LC as shown by the arrows in diagram 300 of FIG. 3. This mode of operation is call "capture mode".

In the capture mode, the designer can confirm the value from each Q pin of flip flop $120_1$, $120_2$, $120_3$ is properly propagated through logic cones LC in multiple cycles. Particularly the designers, can run two cycle capture modes, one for launch clock the other for capture clock, to check if timing requirements are met. This phenomenon is referred to herein as double glitch capture mode.

The current subject can estimate power induced noise in the double glitch capture mode using only shift mode STIL codes. In addition, vectors can be generated based on ATPG pattern in the form of STIL codes. From multiple STIL codes from different scenarios, a power report can be generated for each STIL code. Once a power report for each ATPG pattern is generated, one or multiple STILs can be chosen from the power reports. Value Change Dump (VCD) equivalent data can then be generated from the selected pattern from the shift mode by propagating the vectors further by multiple periods. A full dynamic power integrity simulation can be performed so that power induced noise in the design per STIL code can be determined. In addition, the rank of the multiple STIL patterns in terms of power induced IR drops from the complete analysis can be provided.

With this approach, the instance IR drop voltage waveforms of each instance can be predicted. Hence, DFT engineers can find out actual impact to the timing and the functionality from the power induced noise during the shift-in mode as well as double glitch capture mode. Further, DFT engineers can find out power induced noise upfront from the simulation per each pattern in each STIL code that they create and will be able to find the relation between pattern and power noise at the end.

The current subject matter provides an improved way of estimating which ATPG pattern is better than the others for testing to achieve the most possible coverage of ATPG patterns that do not make power noise related failure. At the same time, the current subject matter enables predicting and fixing possible power noise problems in the testing mode not only in the shift mode also for the double glitch TD capture mode. Based on the real design experience from multiple SOC companies, the current subject matter enables a reduction of one or two months of debugging time.

Figure 4:
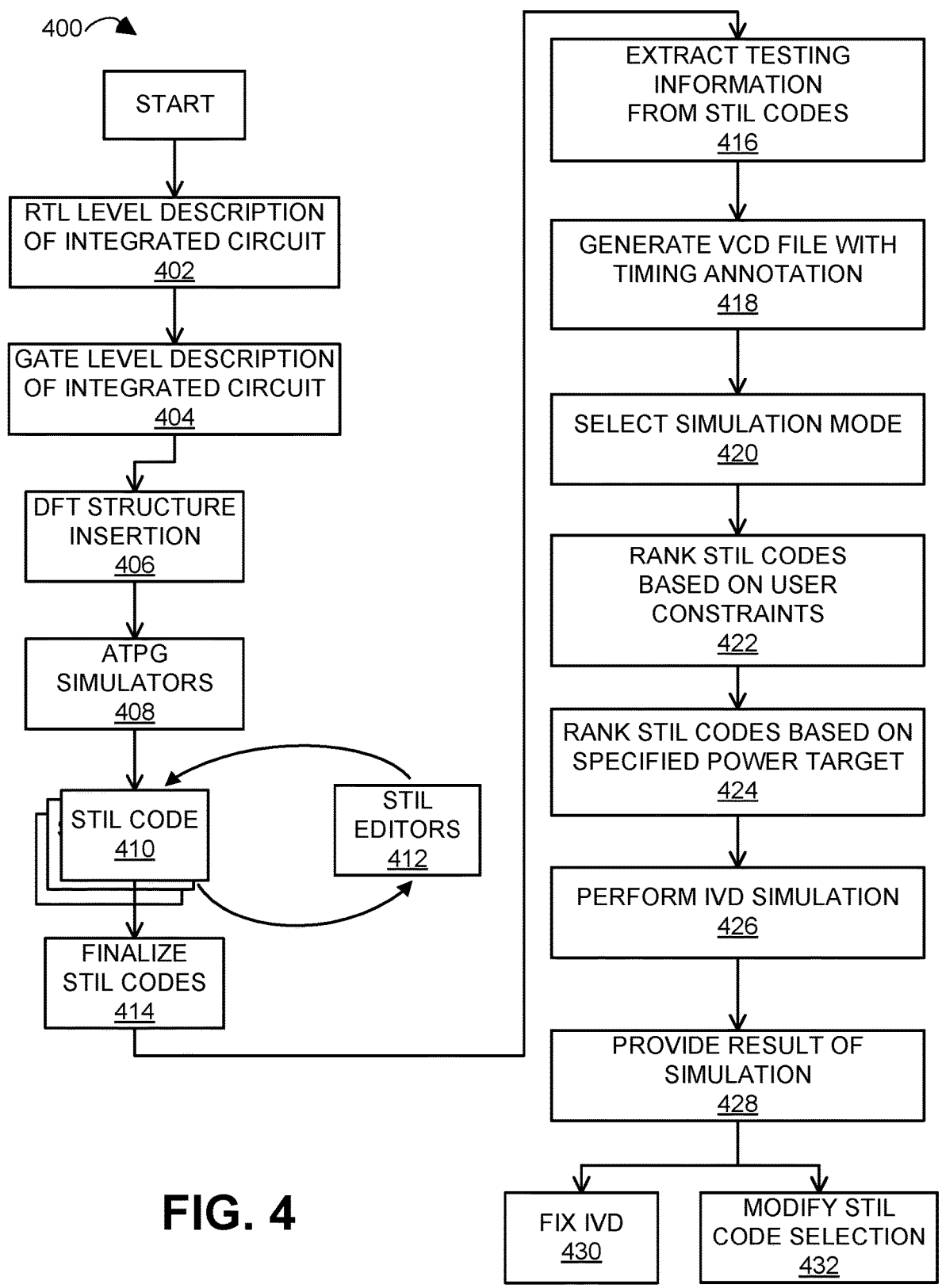
FIG. 4 is a process flow diagram illustrating aspects of a power integrity analysis of an integrated circuit.

FIG. 4 is process flow diagrams 400 illustrating double glitch capture mode analysis in which certain operations are performed by DFT engineers while other aspects are implemented by one or more CAE IC design software applications/design environments (i.e., multiple different applications can be used in some variations, etc.). Initially, at 402, designers come up with the function description of the design and transfer it to RTL language, at this stage only state point information available. Thereafter, at 404, once the technology and the following cell parameters are determined in the design, RTL codes are elaborated to gate level netlist through a netlist synthesis tool. Subsequently, at 406, a DFT structure from a scan insertion tool can be inserted to the gate level netlist to ensure the testability of the design. A scan chain can also be constructed with the scan order being finalized while each cell level gate is being placed. At this stage, the timing of signal propagation through each gate can be measured based on the net delay based on real physical routing information.

The IC design software then simulates ATPG, at 408, generates STIL codes for the targeted tests of the IC (or portion thereof). Each STIL code (410) is a test description language that: a) facilitates the transfer of large volumes of digital test vector data from the CAE environments to automated test equipment (ATE) environments; b) specifies pattern, format, and timing information sufficient to define the application of digital test vectors to a device under test (DUT); c) supports the volume of test vector data generated from structured tests such as scan/automatic test pattern generation (ATPG), integral test techniques such as built-in self test (BIST), and functional test specifications for IC.

At 412, while STIL codes are finalized, the DFT engineers can specify a list of STIL codes that will satisfy the targeted toggle rate or power for the design through many trials with a CAE IC design editor.

At 414, DFT engineer can specify candidates of final STIL codes for the targeted coverage.

At 416, the CAE IC design software can extract signal, signal groups, timing information, patterns from each STIL code and drive the information to gate level vectors generation for multi cycles in shift-quiet-capture modes in any number of cycles in shift or capture modes. In some variations, the CAE IC design software performs such actions for multiple STIL codes in parallel.

At 418, the CAE IC design software can generate a VCD file with timing annotation from the STIL codes propagating down to the logic stream from each flip flops in both the shift in mode as well as the capture mode.

At 420, the CAE IC design software can, at this point, select the simulation mode for shift-in mode or double glitch capture mode. Such selection can either be automatic or in response to user-generated input via a graphical user interface of the CAE IC design software.

At 422, the CAE IC design software can perform detailed instance level power calculation and rank the STIL codes depending on user-specified constraints such as the total power number, toggle rates so on.

At 424, the CAE IC design software can rank STIL codes according to user defined parameters depending on total power, average toggle rate, cell type specific total power or average toggle rate and the like.

At 426, the CAE IC design software can proceed simultaneously to perform instance voltage drop (IVD) analysis depending on the ranks, the user will be able to run analysis either on all of STIL codes or selected STIL codes depending on the ranking 411.

At 428, the CAE IC design software can provide analysis information with root cause per STIL code.

At 430, problems in the IC design can be modified based on suggestion and reports from the CAE IC design software or specific STIL codes can be avoided during testing.

At 432, the CAE IC design software can provide analysis information (i.e., data encapsulating a report, etc.) back to the IC designers so that they can select better STIL codes out of the list, or they can edit the STIL code based on the IVD analysis provided by the CAE IC design software. Having possible STIL codes that satisfy the IVD margin with targeted coverage can potentially eliminate the last minute testing pattern selection once the IC designers find issues from the real testing due to power integrity or reliability issues.

Figure 5:
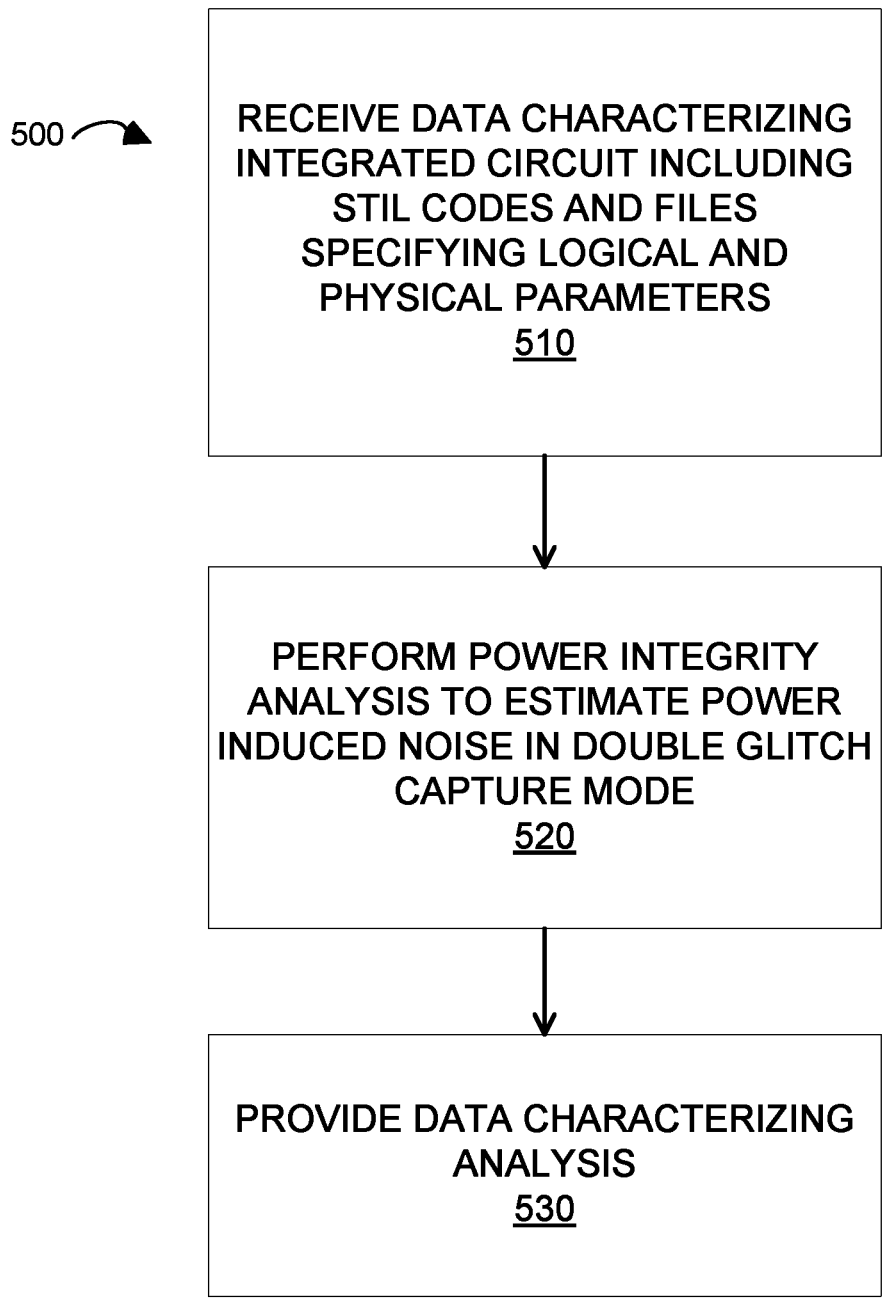
FIG. 5 is a process flow diagram for double glitch capture mode power integrity analysis.

FIG. 5 is a process flow diagram 500 in which, at 510, data is received that characterizes an integrated circuit and includes a plurality of Standard Test Interface Language (STIL) codes, and at least one file defining physical and/or logical parameters of the integrated circuit. Thereafter, at 520, a power integrity analysis of the integrated circuit is performed to estimate power induced noise in a double glitch capture mode. Data is then, at 530, provided (e.g., displayed, loaded into memory, persisted, transmitted to a remote computing system, etc.) that characterizes the performed double glitch capture mode power integrity analysis of the integrated circuit.

In an example procedure, a computer receives data that characterizes an initial integrated circuit. The initial integrated circuit might be a physical integrated circuited that has been fabricated. Or the initial integrated circuit might be in the form of a circuit layout design defined by data in a datafile. The received data includes STIL codes and a file defining physical and/or logical parameters of the initial integrated circuit. The received data may include operational characteristics based on (derived from) observations of inputs to real world, physical integrated circuits. The computer uses the received data to perform a power integrity analysis of the initial integrated circuit, to estimate power induced noise in a double glitch capture mode. The computer outputs data that characterizes the performed double glitch capture mode power integrity analysis. Based on the output data, the initial integrated circuit is modified, and the modified integrated circuit is fabricated.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other. The computing systems/devices can include a variety of devices including personal computers, mobile phones, tablet computers, and Internet-of-Things (IoT) devices.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" or "computer-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, by a computer-aided engineering software program, data characterizing a design of an integrated circuit including
   Standard Test Interface Language (STIL) codes,
   at least one file defining physical and/or logical parameters of the integrated circuit, and
   operational characteristics of other physical integrated circuits;
   performing, by the computer-aided engineering software program using the received data, a simulation of a power integrity analysis of the integrated circuit to estimate power induced noise in a double glitch capture mode;
   providing, by the computer-aided engineering software program, output data characterizing the performed double glitch capture mode power integrity analysis of the integrated circuit;
   modifying, by the computer-aided engineering software program, the design of the integrated circuit based on the output data; and
   fabricating the modified integrated circuit.

2. The method of claim 1, wherein providing the output data comprises displaying the data characterizing the performed double glitch capture mode power integrity analysis of the integrated circuit in an electronic visual display.

3. The method of claim 1, wherein providing the output data comprises transmitting the data characterizing the performed double glitch capture mode power integrity analysis of the integrated circuit to a remote computing system.

4. The method of claim 1, wherein providing the output data comprises loading the data characterizing the performed double glitch capture mode power integrity analysis of the integrated circuit in into memory.

5. The method of claim 1, wherein providing the output data comprises storing the data characterizing the performed double glitch capture mode power integrity analysis of the integrated circuit in physical persistence.

6. The method of claim 1, wherein the STIL codes are according to P. 1450.1 IEEE standard.

7. The method of claim 1, wherein the STIL codes characterize a plurality of linked test structures to which the power integrity analysis is to be applied.

8. The method of claim 7, wherein the test structures comprise one or more of: scan flip-flips, multiplexer, clock control logics, decoder, and encoders.

9. The method of claim 7, further comprising:
extracting timing information, scan patterns, scan chains, control signals, and the linked test structures from the STIL codes.

10. The method of claim 9, further comprising:
generating files corresponding to each STIL code having timing annotations propagating through the test structures in both shift-in mode and double glitch capture mode.

11. The method of claim 10, wherein the generated files are equivalent to gate-level value change dump (VCD) files for the integrated circuit.

12. The method of claim 10, further comprising:
performing simulations using the generated files in double glitch capture mode.

13. The method of claim 12, wherein the simulations are power simulations and/or power integrity simulations.

14. The method of claim 1, wherein the provided data comprises a power report for each STIL code characterizing power induced noise for such STIL code.

15. The method of claim 1, further comprising:
ranking the STIL codes according to user-specified constraint parameters.

16. The method of claim 15, further comprising:
simulating instance voltage drop (IVD) across the integrated circuit using the ranked STIL codes to obtain an IVD analysis for each STIL code, wherein the provided data comprises the IVD analysis for each STIL code.

17. The method of claim 1, wherein the at least one file defining physical and logical parameters of the integrated circuit comprise at least one of: a cell description library file, a design exchange file, a physical description file, or a file specifying timing parameters for the integrated circuit.

18. The method of claim 1, wherein the integrated circuit that is characterized by the received data is an initial integrated circuit, and the method further comprises, before the receiving, fabricating the initial integrated circuit.

19. A system comprising:
at least one programmable data processor; and
a memory storing instructions that are configured to be executed by the at least one data processor to:
receiving, by a computer-aided engineering software program, data characterizing a design of an integrated circuit including
Standard Test Interface Language (STIL) codes,
at least one file defining physical and/or logical parameters of the integrated circuit, and
operational characteristics of other physical integrated circuits;
perform, by the computer-aided engineering software program using the received data, a simulation of a power integrity analysis of the integrated circuit to estimate power induced noise in a double glitch capture mode;
provide, by the computer-aided engineering software program, output data characterizing the performed double glitch capture mode power integrity analysis of the integrated circuit;
modify, by the computer-aided engineering software program, the design of the integrated circuit based on the output data; and
fabricate the modified integrated circuit.

20. A non-transitory processor-readable storage media storing instructions configured to be executed by one or more data processors to:
receiving, by a computer-aided engineering software program, data characterizing a design of an integrated circuit including
Standard Test Interface Language (STIL) codes,
at least one file defining physical and/or logical parameters of the integrated circuit, and
operational characteristics of other physical integrated circuits;
perform, by the computer-aided engineering software program using the received data, a simulation of a power integrity analysis of the integrated circuit to estimate power induced noise in a double glitch capture mode;
provide, by the computer-aided engineering software program, output data characterizing the performed double glitch capture mode power integrity analysis of the integrated circuit;
modify, by the computer-aided engineering software program, the design of the integrated circuit based on the output data; and
fabricate the modified integrated circuit.

* * * * *